US011425696B2

(12) United States Patent
Cherian et al.

(10) Patent No.: US 11,425,696 B2
(45) Date of Patent: Aug. 23, 2022

(54) CROSS-LINK NETWORK ALLOCATION VECTOR (NAV) SETTING FOR MULTI-LINK OPERATION (MLO)

(71) Applicant: QUALCOMM Incorporated, San Diego, CA (US)

(72) Inventors: George Cherian, San Diego, CA (US); Abhishek Pramod Patil, San Diego, CA (US); Sai Yiu Duncan Ho, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/143,017

(22) Filed: Jan. 6, 2021

(65) Prior Publication Data
US 2021/0212045 A1    Jul. 8, 2021

Related U.S. Application Data

(60) Provisional application No. 62/958,257, filed on Jan. 7, 2020.

(51) Int. Cl.
*H04W 72/04* (2009.01)
*H04W 88/06* (2009.01)
*H04W 84/12* (2009.01)

(52) U.S. Cl.
CPC ..... *H04W 72/0406* (2013.01); *H04W 72/048* (2013.01); *H04W 84/12* (2013.01); *H04W 88/06* (2013.01)

(58) Field of Classification Search
CPC ... H04W 48/14; H04W 28/06; H04W 52/325; H04W 52/243; H04W 74/0816;
(Continued)

(56) References Cited

U.S. PATENT DOCUMENTS

| 3,111,624 A | * | 11/1963 | Farkas | H04B 1/74 455/17 |
| 7,443,822 B2 | * | 10/2008 | Lindskog | H04W 28/18 370/329 |

(Continued)

FOREIGN PATENT DOCUMENTS

| WO | WO-2021004052 A1 | * | 1/2021 | ........ H04W 52/0229 |
| WO | WO-2022032150 A1 | * | 2/2022 | |

OTHER PUBLICATIONS

Multi-link Operation in IEEE 802.11be WLANs by Álvaro López-Raventós, Boris Bellalta Jan. 2022 (Year: 2022).*

(Continued)

*Primary Examiner* — William D Cumming
(74) *Attorney, Agent, or Firm* — Patterson + Sheridan, L.L.P.; Kevin M. Donnelly

(57) ABSTRACT

One innovative aspect of the subject matter described in this disclosure may be implemented in a method for wireless communication. The method may be performed, for example, by a first entity of a multi-link device (MLD) to receive a first control frame transmitted on a first wireless link and set, in response to receiving the first control frame, a network allocation vector (NAV) for each link of multiple wireless links of the first MLD based on a duration field in the first control frame.

24 Claims, 12 Drawing Sheets

(58) Field of Classification Search
CPC ..... H04W 74/06; H04W 74/04; H04W 24/10; H04W 28/18; H04W 48/16; H04L 47/10
USPC .......... 455/69, 434; 370/238, 329, 310, 445, 370/311, 321
See application file for complete search history.

(56) References Cited

U.S. PATENT DOCUMENTS

| | | | | |
|---|---|---|---|---|
| 10,834,754 | B2* | 11/2020 | Merlin | H04W 74/04 |
| 2005/0013253 | A1* | 1/2005 | Lindskog | H04W 28/18 370/238 |
| 2006/0111103 | A1* | 5/2006 | Jeong | H04W 48/14 455/434 |
| 2007/0264941 | A1* | 11/2007 | Trainin | H04B 7/0634 455/69 |
| 2010/0039969 | A1* | 2/2010 | Sukenari | H04W 52/325 370/310 |
| 2010/0046518 | A1* | 2/2010 | Takagi | H04L 1/1614 370/392 |
| 2014/0192820 | A1* | 7/2014 | Azizi | H04W 74/0816 370/445 |
| 2015/0009879 | A1* | 1/2015 | Kim | H04W 74/06 370/311 |
| 2015/0063233 | A1* | 3/2015 | Choi | H04W 52/0216 370/329 |
| 2015/0117365 | A1* | 4/2015 | Merlin | H04W 52/243 370/329 |
| 2020/0275306 | A1* | 8/2020 | Shah | G06F 13/368 |
| 2021/0212045 | A1* | 7/2021 | Cherian | H04W 74/0816 |
| 2021/0307064 | A1* | 9/2021 | Ryu | H04W 24/10 |
| 2021/0329698 | A1* | 10/2021 | Jang | H04W 80/02 |
| 2022/0053559 | A1* | 2/2022 | Jang | H04W 74/0816 |

OTHER PUBLICATIONS

R. O. LaMaire, A. Krishna, P. Bhagwat and J. Panian, "Wireless LANs and mobile networking: standards and future directions," in IEEE Communications Magazine, vol. 34, No. 8, pp. 86-94, Aug. 1996, doi: 10.1109/35.533925. (Year: 1996).*

International Search Report and Written Opinion—PCT/US2021/012432—ISA/EPO—dated Apr. 23, 2021.

Jang I., et al., (LG Electronics): "Considerations for Multi-Link Channel Access Without Simultaneous TX/RX Capability," IEEE Draft; 11-19-1917-00-00BE-Considerations-for-Multi-Link-Channel-Access-Without-Simultaneous -TX-RX-Capability, IEEE-SA Mentor, Piscataway, NJ USA, vol. 802.11 EHT; 802 .11be Nov. 11, 2019 (Nov. 11, 2019), pp. 1-19, XP068164346, Retrieved from the Internet: URL: https://mentor.ieee.org/802.11/dcn/19/11-19-1917-00-00be-considerations-for-multi-link-channel-access-without-simultaneous-tx-rx-capability.pptx [retrieved on Nov. 11, 2019], the whole document.

Naribole S., et al., (SAMSUNG): "Multi-Link Channel Access Discussion Follow-Up", IEEE Draft; 11-19-1836-01-00BE-Multi-Link-Channel-Access-Follow-Up, IEEE-SA Mentor, Piscataway, NJ USA vol. 802.11 EHT; 802.11be, No. 1, Dec. 26, 2019 (Dec. 26, 2019), pp. 1-16, XP068164981, Retrieved from the Internet: URL: https://mentor.ieee.org/802.11/dcn/19/11-19-1836-01-00be-multi-link-channel-access-follow-up.pptx [retrieved on Dec. 26, 2019] the whole document.

* cited by examiner

| Initial Tx | Following Tx | Poor isolation on STA | | |
|---|---|---|---|---|
| | | Good isolation on AP | Poor isolation on AP | |
| | | Result | Result | Remark |
| UL on L1 | | | | 11be / 11ax STA precede UL with (ML-)RTS/(ML-)CTS exchange. Pre-ax STA directly starts UL. 11be STAs, upon hearing AP's (ML-)CTS or UL to AP, set cross NAV for the duration of UL. |
| | UL on L2 | No UL on L2 (unnecessary) | No UL on L2 (essential) | 11be STA will not attempt UL since cross NAV is set |
| | DL on L2 | No DL on L2 (unnecessary) | No DL on L2 (essential) | AP2 won't be able to DL on L2 since a 11be STA won't respond to AP2's ML-RTS since it has set cross NAV |
| DL on L1 | | | | AP1 precedes DL with (ML-)RTS/(ML-)CTS exchange. For DL to pre-ax STA, AP1 directly starts DL. 11be STAs, upon hearing AP's DL set cross NAV for the duration of DL. |
| | UL on L2 | No UL on L2 (unnecessary) | No UL on L2 (essential) | 11be STA will not attempt UL since cross NAV is set |
| | DL on L2 | No DL on L2 (unnecessary) | No DL on L2 (essential) | AP2 won't be able to DL on L2 since a 11be STA won't respond to AP2's ML-RTS since it has set cross NAV |
| UL on L2 | | | | 11be STA precede UL with ML-RTS/ML-CTS exchange. Other 11be STAs, upon hearing AP2's ML-CTS, set cross NAV for the duration of UL. |
| | UL on L1 | No UL on L1 (unnecessary) | No UL on L1 (essential) | 11be STA will not attempt UL since cross NAV is set |
| | DL on L1 | No DL on L1 (unnecessary) | No DL on L1 (essential) | AP1 won't be able to DL on L1 since a 11be STA won't respond to AP1's ML-RTS since it has set cross NAV |
| DL on L2 | | | | AP2 precedes DL with ML-RTS/ML-CTS exchange. Other 11be STAs set cross NAV for the duration of DL. |
| | UL on L1 | No UL on L1 (unnecessary) | No UL on L1 (essential) | 11be STA will not attempt UL since cross NAV is set |
| | DL on L1 | No DL on L1 (unnecessary) | No DL on L1 (essential) | AP1 won't be able to DL on L1 since a 11be STA won't respond to AP1's ML-RTS since it has set cross NAV |

*Figure 11*

CROSS-LINK NETWORK ALLOCATION VECTOR (NAV) SETTING FOR MULTI-LINK OPERATION (MLO)

CROSS-REFERENCE TO RELATED APPLICATION(S)

This application claims benefit of and priority to U.S. Provisional Application No. 62/958,257, filed Jan. 7, 2020, herein incorporated by reference in its entirety as if fully set forth below and for all applicable purposes.

TECHNICAL FIELD

This disclosure relates generally to wireless communication, and more specifically, to techniques for communicating over multiple wireless links, for example, between multi-link devices (MLDs).

DESCRIPTION OF THE RELATED TECHNOLOGY

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The deployment of wireless local area networks (WLANs, sometimes referred to as Wi-Fi networks) in the home, the office, and various public facilities is commonplace today. Such networks may employ a wireless access point (AP) that connects a number of wireless stations (STAs) in a specific locality (such as the aforementioned home, office, public facility, etc.) to another network, such as the Internet or the like. A set of STAs can communicate with each other through a common AP in what is referred to as a basic service set (BSS).

In order to address issues associated with the increasing bandwidth requirements demanded for wireless communications systems, different schemes are being developed to allow multiple user terminals to communicate with a single access point by sharing the channel resources while achieving high data throughput. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard (including amendments thereto such as 802.11ax, 802.11ay and 802.11be). The IEEE 802.11 standard denotes a set of WLAN physical (PHY) layer and medium access control (MAC) standards developed by the IEEE 802.11 committee for short-range communications (such as tens of meters to a few hundred meters).

Some wireless networks, such as 802.11be networks (also referred to as Extremely High Throughput (EHT) networks), allow devices (which may be referred to as multi-link devices (MLDs)) to communicate via two or more communication links simultaneously, for example, using multi-link aggregation (MLA). Multi-link Operation (MLO) is generally regarded as one of the key features in the upcoming 802.11be standard. The enablement of multi-link communications presents challenges associated with transmission and acknowledgement schemes. For example, some MLDs may include STA instances that do not have tight coordination between them. It is desirable that the MLO framework account for MLDs with a variety of capabilities.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method can be performed, for example, by a first entity of a first multi-link device (MLD). The method includes receiving a first control frame transmitted on a first wireless link. The method includes setting, in response to the receiving the first control frame, a network allocation vector (NAV) for each link of multiple wireless links of the first MLD based on a duration field in the first control frame. In some implementations, the first control frame comprises a request to send (RTS) frame or a clear to send (CTS) frame.

In some implementations, setting of the NAV for the multiple wireless links comprises transmitting a control frame on each link of the multiple wireless links.

In some implementations, the transmitted control frame is configured to cause other MLDs to set a NAV for each link of the multiple wireless links of the respective other MLDs.

In some implementations, the setting of the NAV for the multiple wireless links comprises signaling a second entity of the first MLD to set the NAV for a second wireless link of the multiple wireless links.

In some implementations, the method further comprises receiving a second control frame on the first wireless link and refraining from responding to the second control frame until expiration of a timer associated with the NAV for the first wireless link.

In some implementations, the method further comprises determining whether a basic service set (BSS) identifier (BSSID) in the first control frame indicates that the first control frame was transmitted from a device that is part of a same BSS as the first MLD, wherein the setting of the NAV for the multiple wireless links is further based on the BSSID in the first control frame indicating that the first control frame was transmitted from a device that is part of a same BSS as the first MLD.

In some implementations, the method further comprises configuring one or more devices not capable of multi-link aggregation (MLA) to operate on a common one of the multiple wireless links.

In some implementations, the configuration comprises transmitting an operation element that configures the one or more devices not capable of MLA to operate on the common one of the multiple wireless links.

In some implementations, the configuration comprises transmitting an operation element with a field having a value that indicates to the one devices not capable of MLA to send request to send (RTS) frames before transmitting on any of the multiple wireless links.

In some implementations, the method further comprises transmitting signaling, wherein the signaling enables or disables setting a NAV for multiple links for one or more other MLDs.

In some implementations, the method further comprises enabling or disabling setting the NAV for multiple wireless links for one or more other MLDs based on one or more criteria associated with a capability of the first MLD.

Another innovative aspect of the subject matter described in this disclosure can be implemented in an apparatus for wireless communications by a first entity of a first MLD. The apparatus includes at least one processor, and at least one memory communicatively coupled with the at least one processor and storing processor-readable code that, when executed by the at least one processor, is configured to cause the apparatus to: receive a first control frame transmitted on a first wireless link, and set, in response to receiving the first control frame, a NAV for each link of multiple wireless links of the first MLD based on a duration field in the first control frame.

Another innovative aspect of the subject matter described in this disclosure can be implemented in an apparatus for wireless communication. The apparatus includes means for receiving a first control frame transmitted on a first wireless link, and means for setting, in response to receiving the first control frame, a NAV for each link of multiple wireless links of the first MLD based on a duration field in the first control frame.

Another innovative aspect of the subject matter described in this disclosure can be implemented in a computer-readable medium having instructions stored thereon to cause an apparatus to receive a first control frame transmitted on a first wireless link, and set, in response to receiving the first control frame, a NAV for each link of multiple wireless links of the first MLD based on a duration field in the first control frame.

Other innovative aspects of the subject matter described in this disclosure can be implemented in various apparatus, means, and computer program products corresponding to the methods and operations described above.

BRIEF DESCRIPTION OF THE DRAWINGS

Details of one or more implementations of the subject matter described in this disclosure are set forth in the accompanying drawings and the description below. However, the accompanying drawings illustrate only some aspects of this disclosure. Other features, aspects, and advantages will become apparent from the description, the drawings and the claims.

FIG. 11 shows a table summarizing different scenarios for cross-link NAV setting according to some implementations.

Like reference numbers and designations in the various drawings indicate like elements.

DETAILED DESCRIPTION

Figure 1:
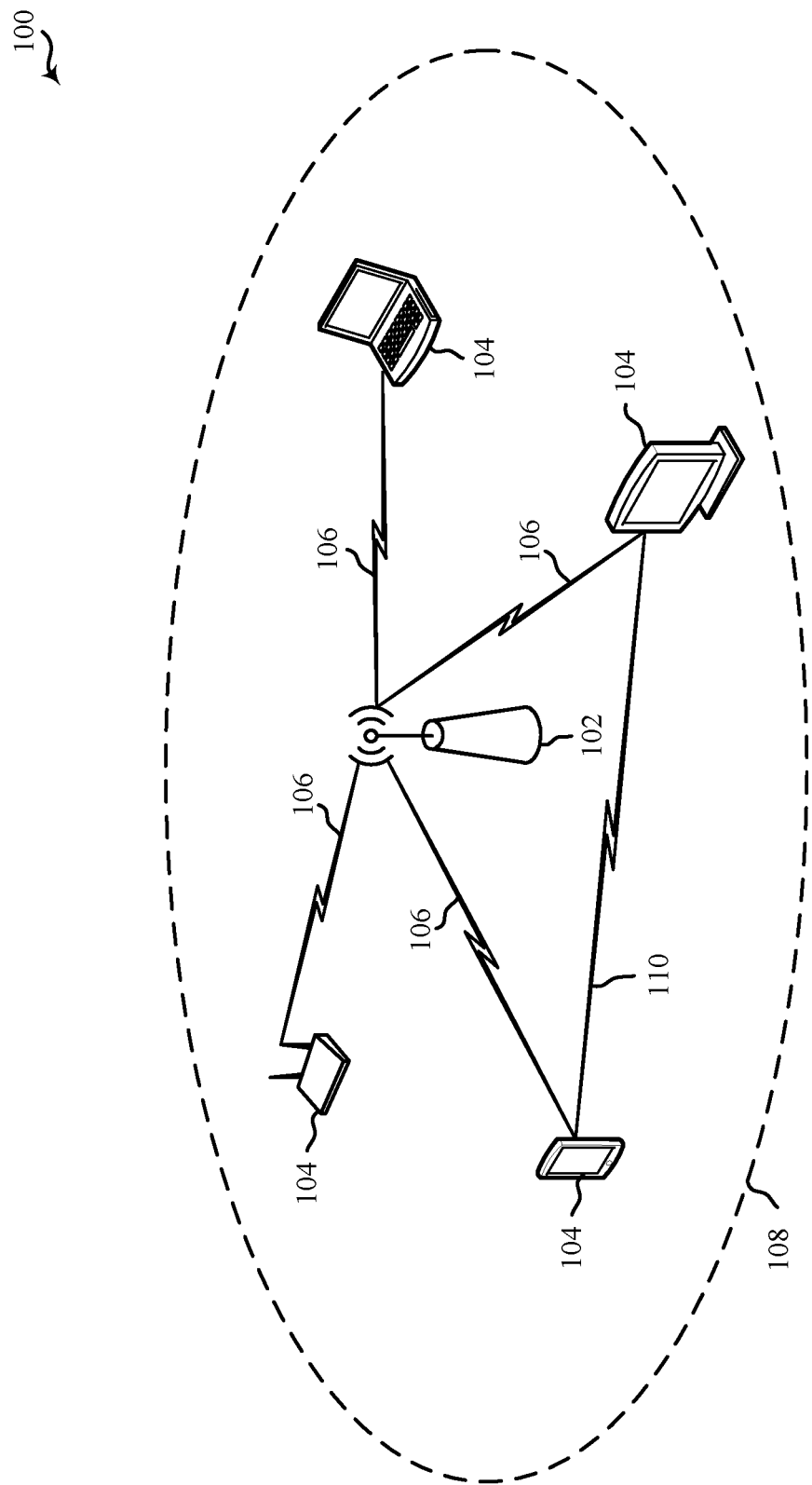
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth® Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

As initially described above, some wireless networks, such as 802.11be networks, allow multi-link devices (MLDs) to utilize a feature called multi-link aggregation (MLA), whereby medium access control (MAC) protocol data units (MPDUs) from a same traffic ID (TID) can be sent in two or more links.

In some MLD implementations, filtering components may be limited resulting in limited isolation between different wireless links, for example, in different respective bands such as the 2.4 GHz, 5 GHz, 6 GHz or 60 GHz bands. Further, in some MLD implementations, the speed of communication between the hardware of the different entities within an MLD, such as access point (AP) stations (STAs) (STAs serving as APs or simply "APs") or non-AP STAs (or simply "STAs"), may be limited or APs may not be co-located (this is generally referred to as "loose coupling" between the MLD entities). As a result, a (non-AP or AP) STA of an MLD associated with one wireless link may not be aware of transmissions on another wireless link. For such reasons, transmissions (to or from the MLD) on one wireless link may potentially interfere with transmissions (to or from the MLD) on another wireless link.

A network allocation vector (NAV) generally refers to a carrier-sensing mechanism used by STAs attempting to access a wireless medium. MAC layer frame headers (transmitted on the medium) contain a duration field that specifies the transmission time required for the corresponding frame (or transaction). STAs monitoring the wireless medium can read the duration field and set their NAV. The NAV indicates to the STAs a time period for which they must refrain from accessing the medium. The NAV may be thought of as a counter, which counts down to zero. In IEEE 802.11, the NAV represents the number of microseconds the transmitting STA intends to hold the medium busy (maximum of 32,767 microseconds).

Various implementations relate generally to MLDs, such as those deployed in 802.11be networks (also referred to as Extremely High Throughput (EHT) networks) that utilize MLA. The techniques described herein may efficiently and reliably protect transmissions on different wireless links from interference (caused by transmissions on the same or other links). Further, the techniques described herein may enable a first entity of an MLD (for example, a non-AP STA or AP STA of that MLD) to receive a first control frame transmitted on a first wireless link and set, in response to the reception of the first control frame, a network allocation vector (NAV) for each link of multiple links of the MLD based on a duration field in the first control frame.

Particular implementations of the subject matter described in this disclosure may be implemented to realize one or more of the following potential advantages. In some implementations, the described techniques may be used to enable efficient NAV setting across multiple links (for example, multi-link NAV setting, also referred to herein as cross-link NAV setting). Efficient NAV setting across multiple links may help prevent potentially interfering transmissions.

FIG. 1 shows a block diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The wireless communication network 100 may include numerous wireless communication devices such as an AP 102 and multiple user STAs 104. While only one AP 102 is shown, the wireless communication network 100 also can include multiple APs 102.

Each of the user STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the wireless communication network 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu$s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the wireless communication network 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the wireless communication network 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the physical (PHY) and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
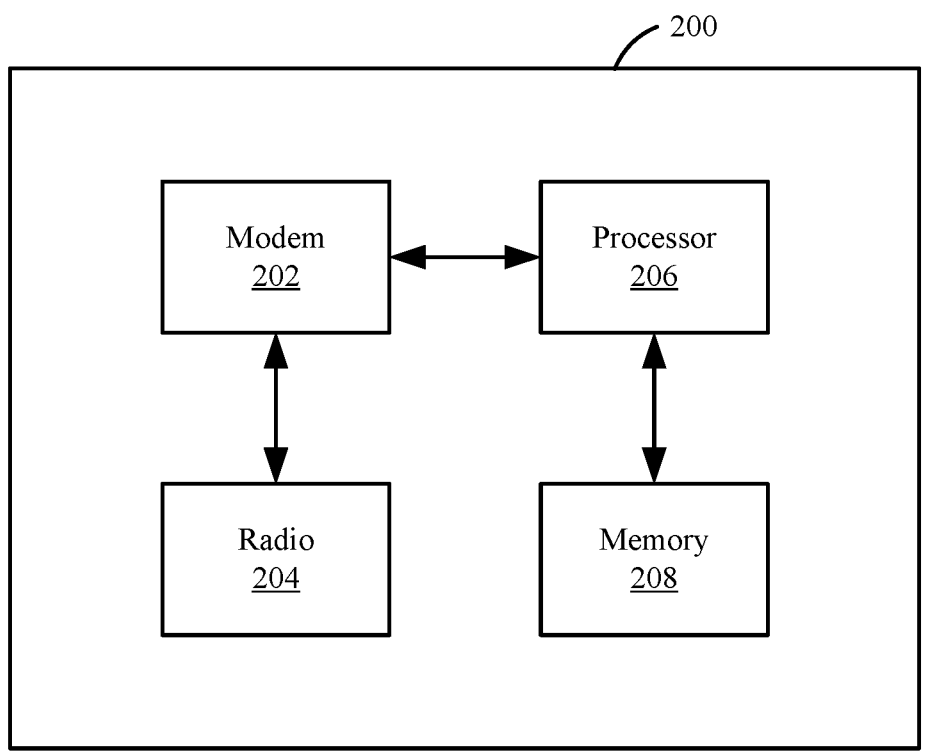
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described above with reference to FIG. 1. In some implementations, the wireless communication device 200 can be an example of a device for use in an AP such as the AP 102 described above with reference to FIG. 1. The wireless communication device 200 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 200 can be, or can include, a chip, system on chip (SoC), chipset, package or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more radios 204 (collectively "the radio 204"). In some implementations, the wireless communication device 206 further includes one or more processors, processing blocks or processing elements 206 (collectively "the processor 206") and one or more memory blocks or elements 208 (collectively "the memory 208").

The modem 202 can include an intelligent hardware block or device such as, for example, an application-specific integrated circuit (ASIC) among other possibilities. The modem 202 is generally configured to implement a PHY layer. For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer and a demultiplexer. For example, while in a transmission mode, data obtained from the processor 206 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 206) for processing, evaluation or interpretation.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which then transmits the symbols via the coupled antennas. Similarly, symbols received via the antennas are obtained by the radio 204, which then provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
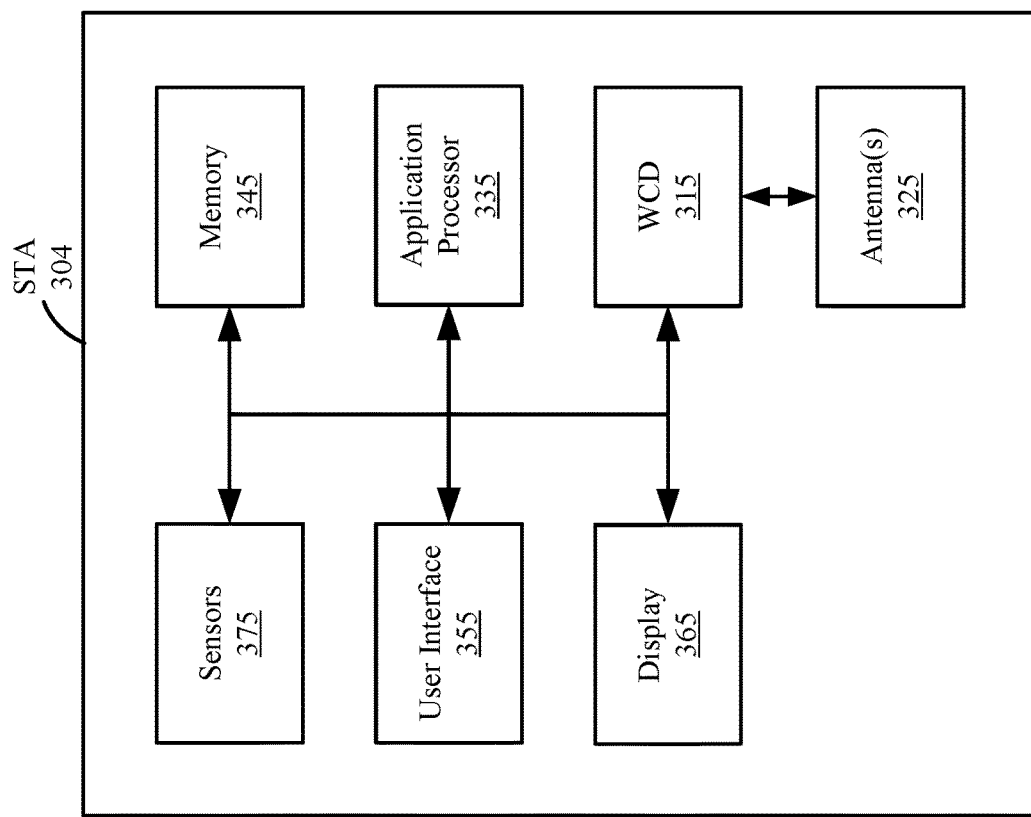
FIG. 3B shows a block diagram of an example station (STA).
Figure 3A:
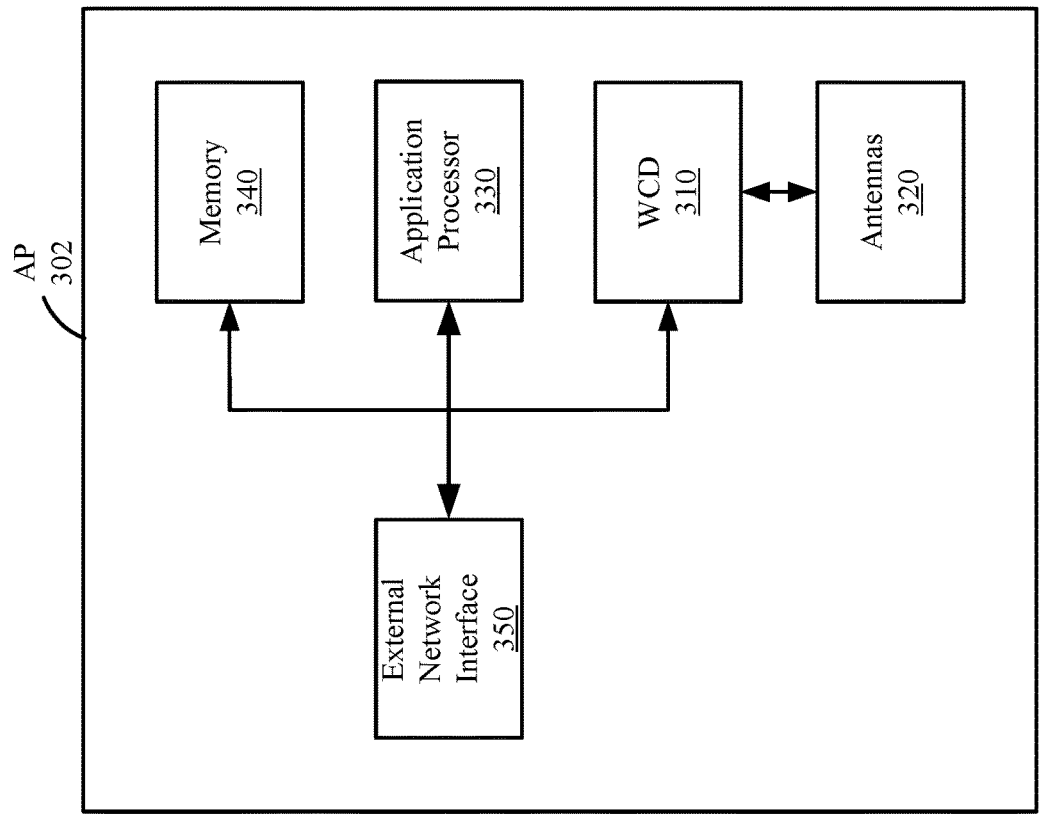
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device 300 described with reference to FIG. 3. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Example Cross-Link Network Allocation Vector (NAV) Setting for Multi-Link Operations (MLOs)

As initially described above, a multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 4:
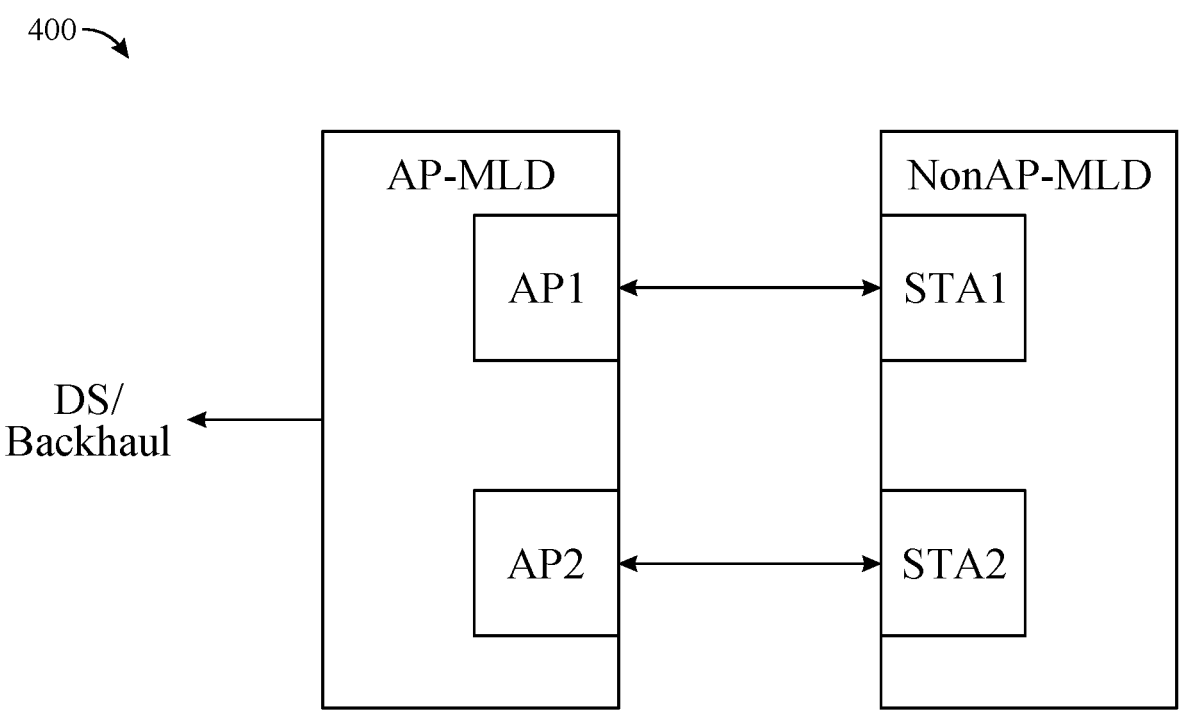
FIG. 4 shows a block diagram of an example multi-link device (MLD) deployment.

FIG. 4 shows a block diagram of an example MLD deployment. As shown in FIG. 4, an access point (AP) MLD may communicate with a non-AP MLD. Each of the AP MLD and non-AP MLD may include at least two STA entities (hereinafter also referred to simply as "STAs") that may communicate with associated STAs of another MLD. In an AP MLD, the STAs may be AP STAs (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Figure 5A:
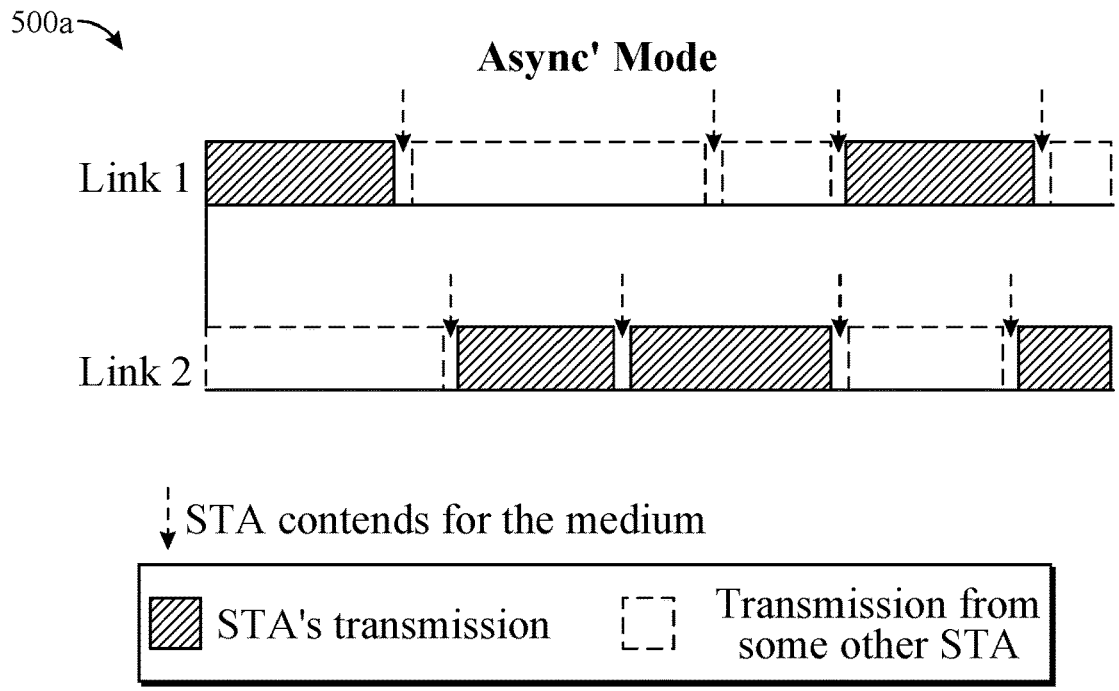
FIGS. 5A and 5B show example timing diagrams for various modes of communication in a MLD deployment.
Figure 5B:
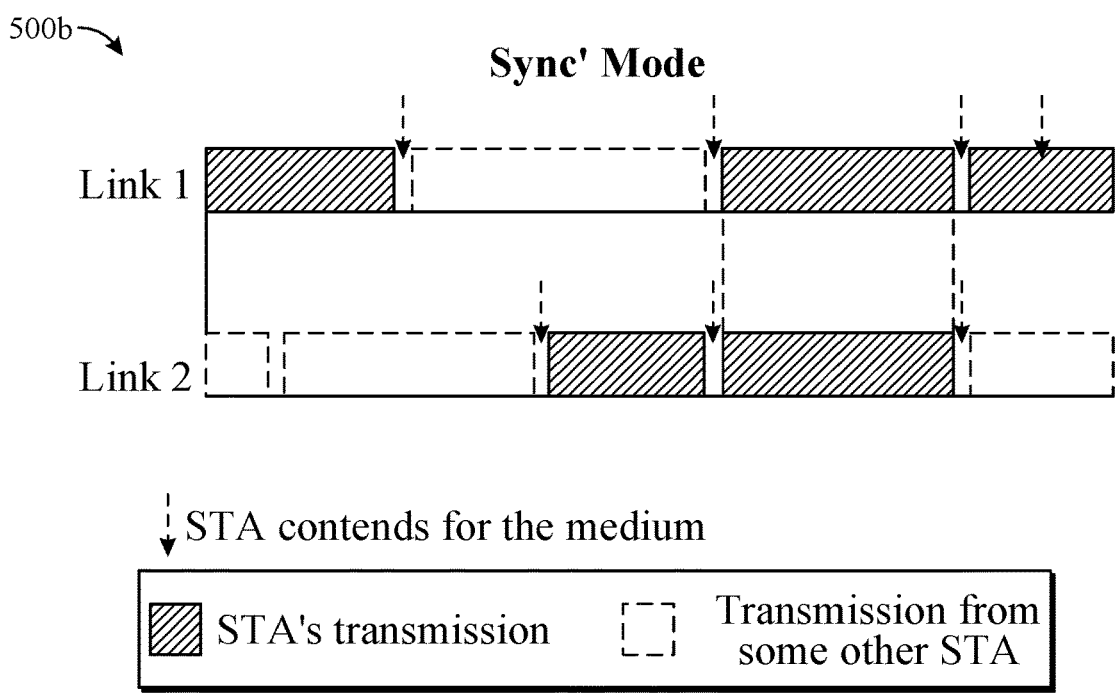

Various modes of communication may be employed in MLD implementations. FIGS. 5A and 5B show example timing diagrams for various modes of communication in a MLD deployment. As shown in FIG. 5A, a MLD may communicate in an Asynchronous (Async) mode. As shown in FIG. 5B, a MLD may communicate in a Synchronous (Sync) mode.

In the Async mode, a STA/AP may count down (for example, via a random backoff (RBO)) on both wireless links. As shown in FIG. 5A, a physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also count down on both wireless links. As shown in FIG. 5B, if Link 1 wins the medium, both links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to its tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that wins the medium. The other wireless link may be blocked by in-device interference greater than −62 decibels per milliwatt (dBm). No aggregation gains may be realized in this mode.

As described above, in some MLD implementations, the filtering may be limited, thus resulting in limited isolation between different wireless links. Further, in some MLD implementations, the speed of communication between the hardware of the different entities within an MLD, such as AP STAs, may be limited or APs may not be co-located (this is generally referred to as "loose coupling" between the MLD entities). As a result, a (non-AP or AP) STA of an MLD associated with one wireless link may not be aware of transmissions on another wireless link. For such reasons, transmissions (to or from the MLD) on one wireless link may potentially interfere with transmissions (to or from the MLD) on another wireless link.

Figure 6:
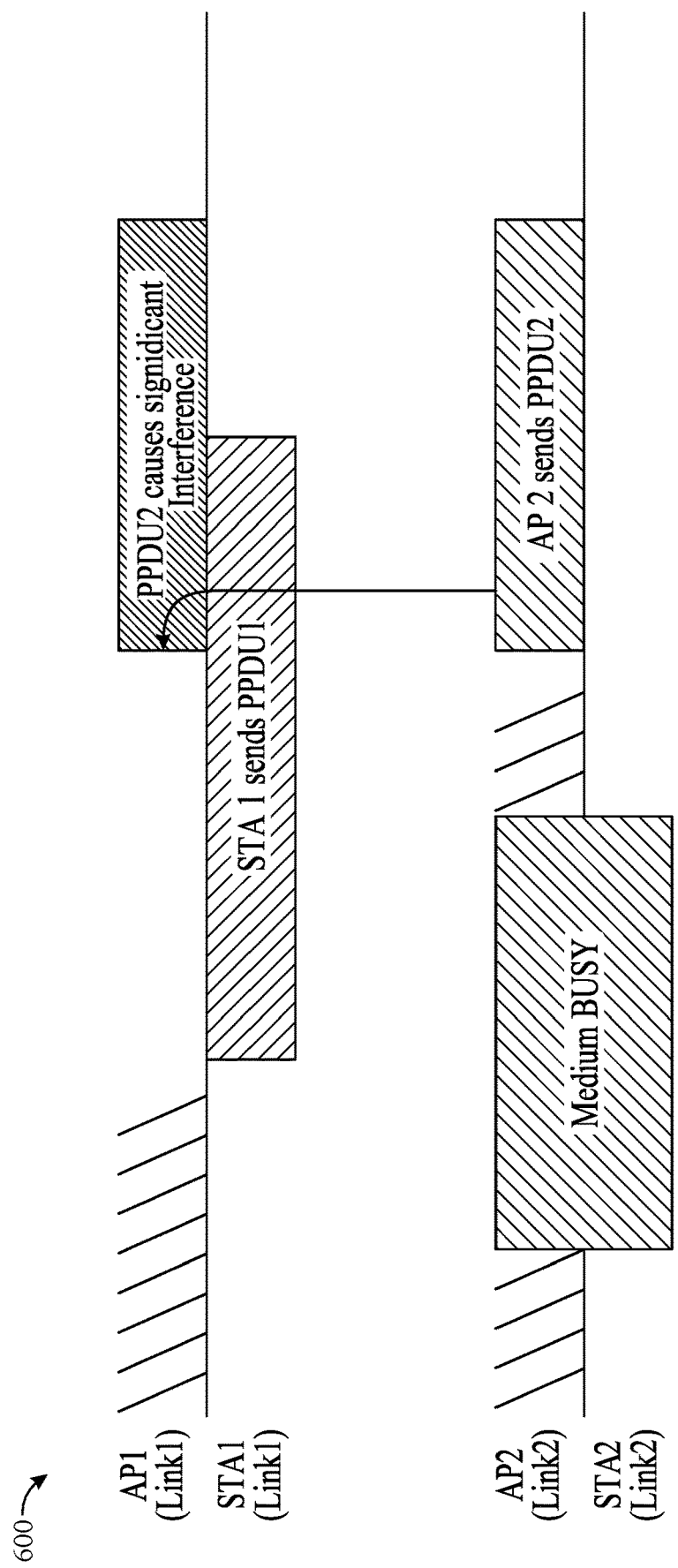
FIG. 6 shows an example of potential interference in a MLD deployment.

FIG. 6 shows an example of potential interference in a MLD deployment. As shown in FIG. 6, a first STA (for example, a non-AP MLD STA1) may begin transmitting (PPDU1) on a first wireless link (Link 1, for example, 5 GHz) to a first AP (AP1) of an MLD, while a second wireless link (Link 2, for example, 6 GHz) is busy (Medium BUSY as shown in FIG. 6). A second AP (AP2), unaware of the on-going transmission on Link 1 (potentially due to loose coupling with AP1), may start transmitting (PPDU2) on Link 2. As shown, the transmission of PPDU2 by AP2 may cause significant interference to the reception of PPDU1 by AP1 (for example, particularly in the case of poor filtering at the MLD between Link 1 and Link 2).

Particular implementations of the subject matter described in this disclosure may be implemented to realize one or more of the following potential advantages. In some implementations, the described techniques may be used to use enable efficient NAV setting across multiple wireless links, which may help prevent potentially interfering transmissions. In some implementations, cross-link NAV setting may involve setting individual NAVs corresponding to different wireless links (for example, individual AP/non-AP MLD STAs may maintain a NAV for a corresponding wireless link).

Figure 7:
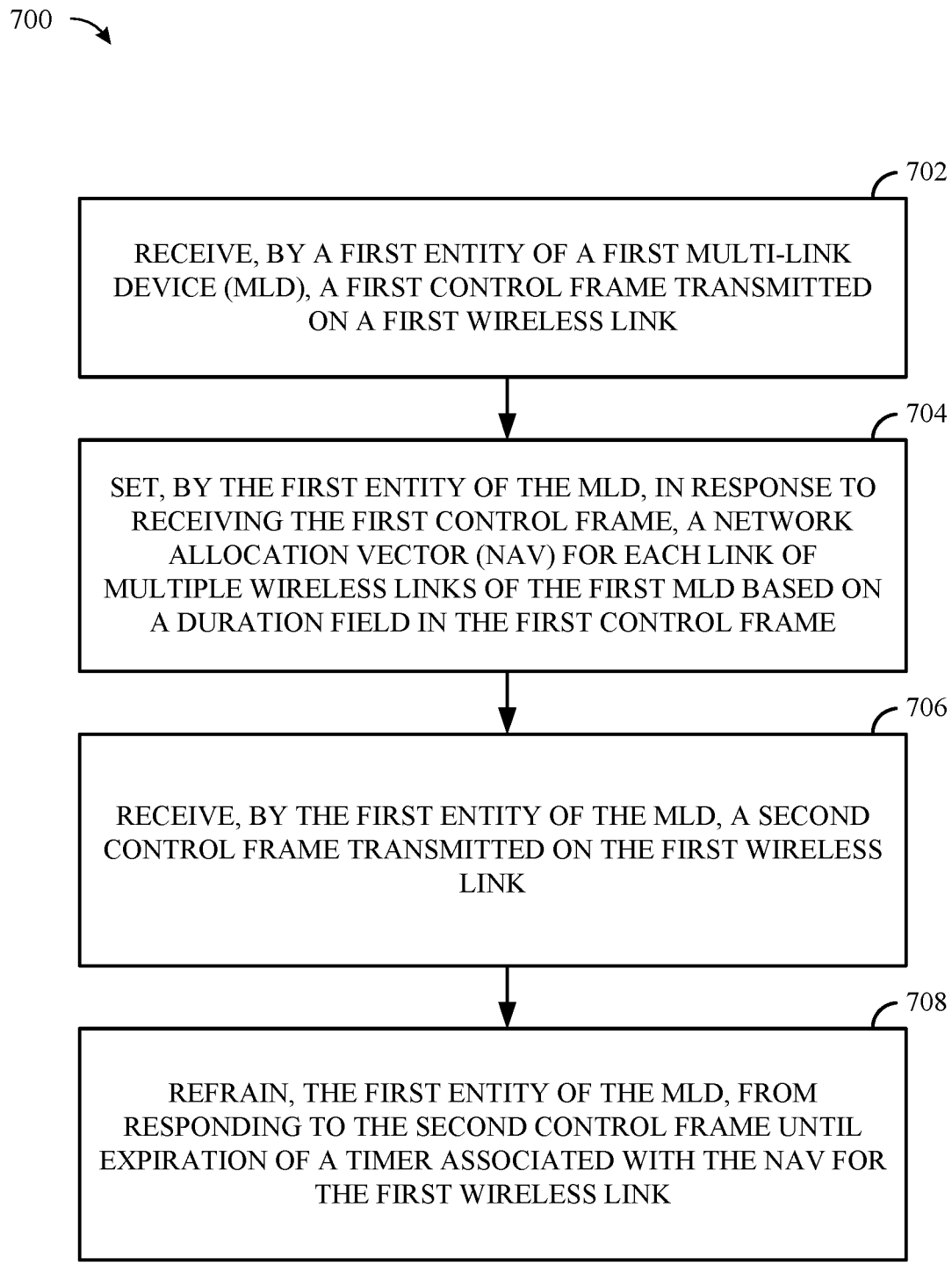
FIG. 7 shows a flowchart illustrating an example process for a first entity of a MLD according to some implementations.

FIG. 7 shows a flowchart illustrating an example process 700 for a first entity of an MLD according to some implementations. The operations of process 700 may be implemented by a wireless communication device or its components, as described herein. For example, the process 700 may be performed by a wireless communication device, such as the wireless communication device 200 described above with reference to FIG. 2, configured to operate as an MLD AP or non-AP STA.

In some implementations, in block 702, the first entity receives a first control frame transmitted on a first wireless link. For example, as will be described in greater detail below with reference to examples shown in FIGS. 8-10, the first control frame may be a request to send (RTS) frame or a clear to send (CTS) frame.

In block 704, the first entity sets, in response to receiving the first control frame, a network allocation vector (NAV) for each link of multiple wireless links of the first MLD based on a duration field in the first control frame. For example, if the first entity is a first AP of an AP MLD, the first AP may communicate with a second AP (associated with a second wireless link) so that the second AP may set the NAV for its wireless link. In block 706, the first entity receives a second control frame transmitted on the first wireless link. In block 708, the first entity refrains from responding to the second control frame until expiration of a timer associated with the NAV for the first wireless link.

Figure 8:
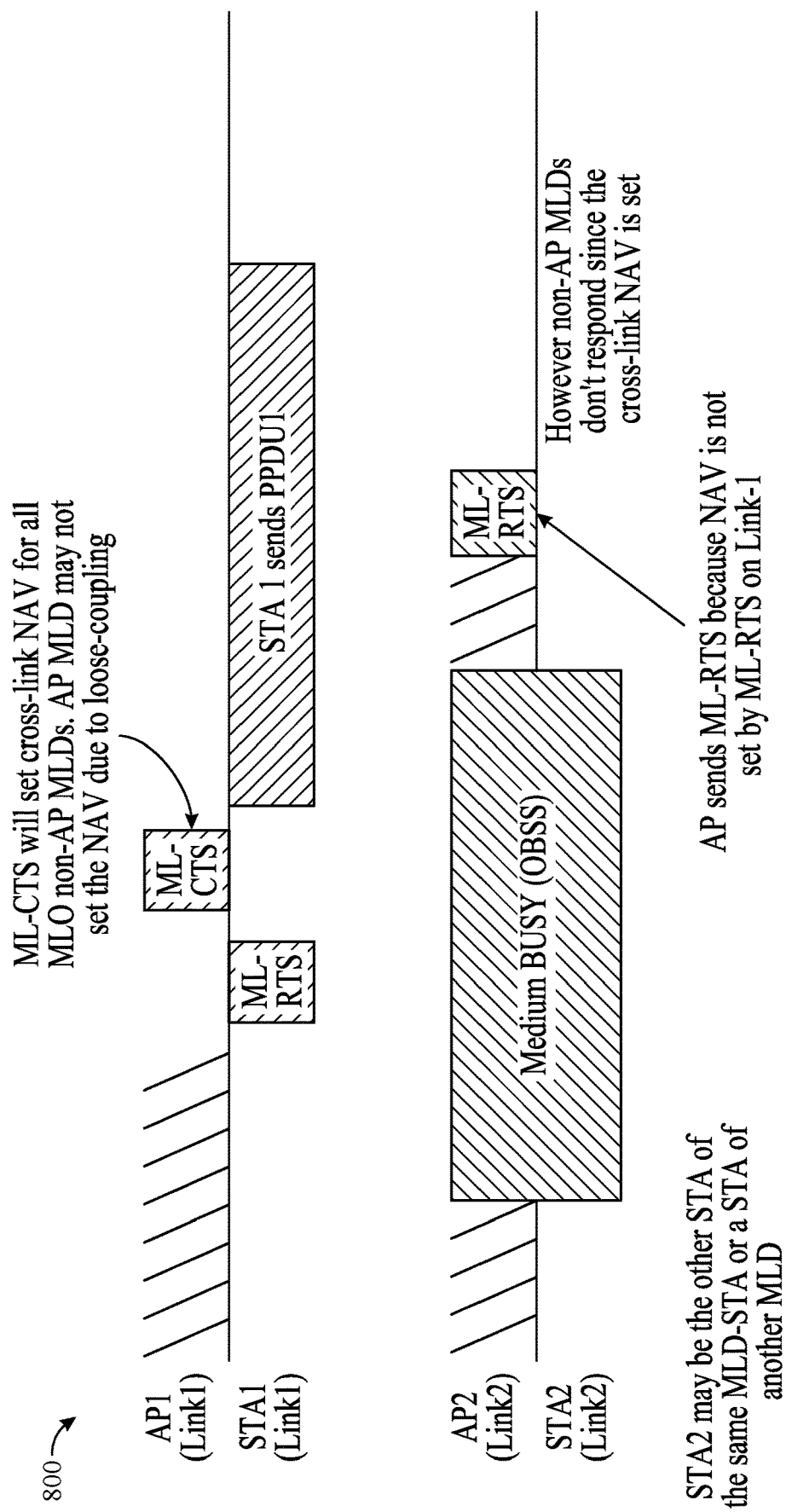
FIG. 8 shows an example timing diagram of cross-link network allocation vector (NAV) setting according to some implementations.

FIG. 8 shows an example timing diagram of cross-link NAV setting according to some implementations. As with the example shown in FIG. 6, STA1 may begin transmitting (PPDU1) on a first wireless link (e.g., Link 1) to AP1 of a MLD, while a second wireless link (for example, Link 2) is busy (shown as "Medium Busy (Overlapping Basic Service Set (OBSS))" in FIG. 6).

In the example of FIG. 8, however, STA1 may send a control frame, shown as a multi-link RTS (ML-RTS), prior to its transmission of PPDU1. The ML-RTS frame may be implemented as a modified version of a multi-user (MU) RTS frame (which may be sent to multiple STAs). In some implementations, both AP and non-AP MLDs may be configured to send ML-RTS frames prior to transmitting PPDUs. Other examples of control frames to initiate multi-link NAV setting may include Buffer Status Report Poll (BSRP) and Bandwidth Query Report Poll (BQRP) frames.

In some cases, an immediate response may be sent on all the wireless links (such as a control frame) in response to the initiating (control) frame so that the NAV is also set for the other wireless links (other than the wireless link where the initiating/control frame was sent). For example, in response to the ML-RTS frame sent by STA1, AP1 may send its own control frame, shown as a multi-link CTS (ML-CTS). The ML-CTS may be implemented as a modified version of a conventional CTS frame. Transmitting an ML-CTS from AP1 may help ensure all devices served by AP1 receive the ML-CTS. Non-MLA capable STAs may update the NAV on their single wireless link, while MLA capable STAs may update the NAV on multiple wireless links.

Upon reception of an ML-CTS, tight-coupled devices (such as, STAs of non-AP MLDs) may set the NAV for both wireless links. In some cases, a MLD STA (or AP) receiving the ML-CTS on its wireless link may communicate with the other STA (or AP) of the same MLD to set the NAV for its wireless link. Each of the MLD STAs may set the NAV for their wireless link to the duration field read (by the detecting STA) from the ML-CTS frame, thereby providing protection for PPDU1.

As shown in FIG. 8, the ML-CTS sent by AP1 may set the cross-link NAV for all MLO non-AP MLDs. Because the ML-CTS may be sent while Link 2 is busy (and possibly due to loose-coupling between AP1 and AP2), AP2 may not set its NAV for Link 2. However, AP2 may be configured to send its own ML-RTS before transmitting on Link 2. Because non-AP MLDs may set their NAV on multiple wireless links (cross-link NAV), non-AP MLDs may not respond to the ML-RTS sent by AP2. Having not received an ML-CTS, AP2 may refrain from transmitting on Link 2, thereby avoiding the interference to PPDU1 shown in FIG. 6.

In some cases, cross-link NAV setting may be performed only based on "in-basic service set (in-BSS)" control frames (such as, ML-RTS/ML-CTS). This means control frames may be identified as control frames coming from a device in a same BSS as the receiver. A control frame may be identified as "in-BSS," for example, based on a BSS Identifier (BSSID). In some implementations, any in-BSS NAV detected on one wireless link by a MLD may be used to set the NAV for another wireless link. As noted previously, it may be assumed that non-AP MLDs have a fast internal communication between the wireless links, thereby allowing those entities (such as, non-AP STAs) to communicate and set the NAV on other wireless links.

Figure 9:
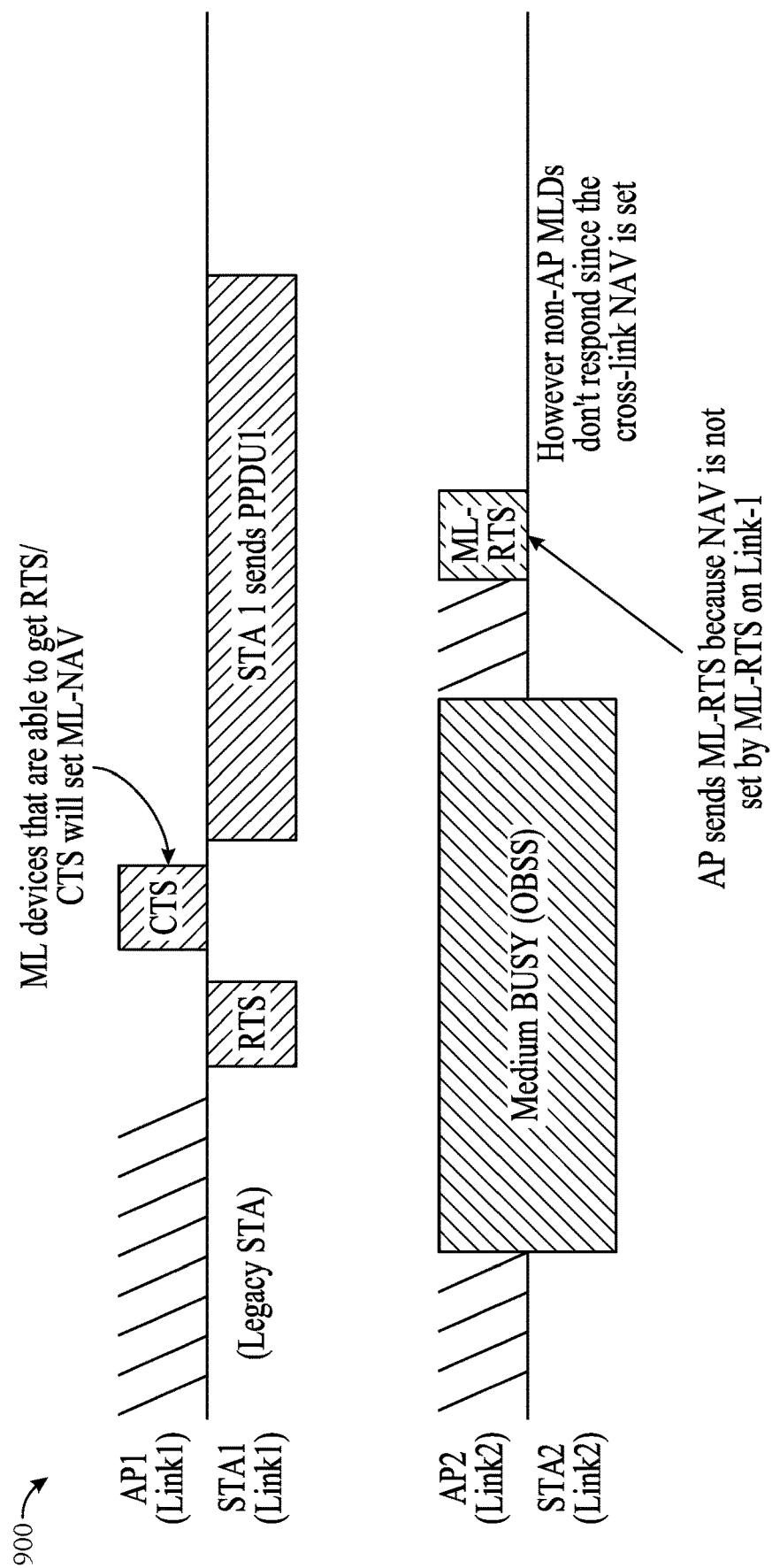
FIG. 9 shows another example timing diagram of cross-link NAV setting according to some implementations.

According to some implementations, additional rules may be implemented to help enable cross-link NAV setting. FIG. 9 shows another example timing diagram of cross-link NAV setting, according to some implementations. As shown in the example of FIG. 9, devices that are not MLA capable (such as, 802.11 ax or other so called "legacy" STAs) may be configured to send RTS frames (and wait for CTS frames) before transmitting on a medium. In some cases, an AP (AP MLD) may transmit an operation element (such as, a high-efficiency (HE) operation element) with a field (for example, a Transmit Opportunity (TXOP) Duration RTS Threshold field) designed to configure STAs for transmitting RTS before transmitting.

In the example shown in FIG. 9, STA1 may be assumed to be a legacy STA configured to send a RTS (and wait for a CTS) before transmitting a PPDU on Link 1. In response to detecting the RTS or CTS, MLA-capable devices may set their NAV (for each wireless link) across multiple wireless links.

Figure 10:
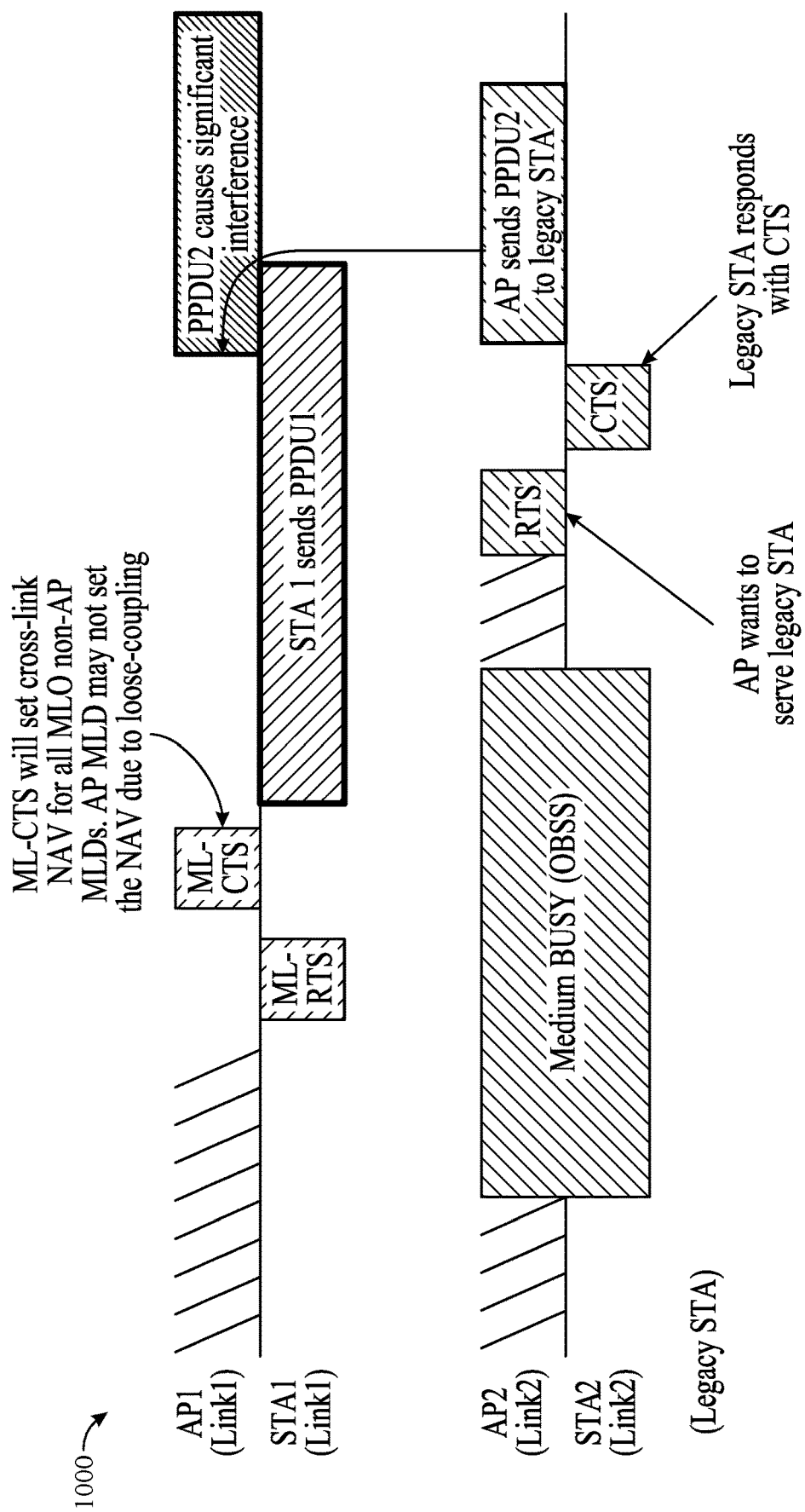
FIG. 10 shows another example timing diagram of cross-link NAV setting according to some implementations.

In some cases, with the solution described above, an AP may start transmission to a legacy STA while reception from an ML STA is on-going. FIG. 10 shows another example timing diagram of cross-link NAV setting according to some implementations. As shown in FIG. 10, AP2 may be unaware of the transmission of PPDU1 from STA1 on Link 1 to AP1. Further, a legacy STA2 may not have detected the ML-RTS or ML-CTS either and may respond to a RTS from AP2 with a CTS. As a result, AP2 may transmit a PPDU (such as, PPDU2) to a legacy STA (STA2) on Link 2 while the PPDU1 transmission from STA1 to AP1 on Link 1 is still on-going. As shown, the transmission of PPDU2 may cause significant interference to PPDU1.

In some implementations, devices may be configured to operate on particular channels in an effort to avoid such scenarios as shown in FIG. 10. For example, non-AP MLDs may be allowed to operate on multiple primary channels when all devices in a corresponding BSS are MLA capable. If legacy devices are allowed in the BSS, the legacy devices may be configured to operate on a single primary (one of the multiple wireless links of the MLD). In such cases, both MLD and legacy devices may share a same single primary wireless link. In some cases, however, an AP MLD may have multiple primaries. For example, the AP MLD may be able to use any primary to access and send downlink (DL) data to non-AP MLDs. In such cases, the AP MLD may use a trigger frame on any wireless link to solicit HE transport block (TB) PPDU from non-AP MLDs.

In some cases, the particular configuration and operation of an MLD may depend on a device's capabilities (for example, the amount of isolation between channels). In some cases, a MLD may have pre-existing knowledge of such capabilities. In other cases, a MLD may determine such capabilities (for example, by transmitting a signal on one wireless link while monitoring/measuring on another wireless link).

Where a MLD has good isolation (for example, as determined by some metric), multiple primary channels may be allowed. Where a MLD has poor isolation, only a single primary may be allowed for both AP and STAs. In some implementations, even in cases of poor isolation, with cross-link NAV setting, multiple primaries may be allowed (for example, where there is good coupling at both the AP and STAs).

In some implementations, even in cases of poor isolation and loose coupling for APs of the AP MLD, with cross cross-link NAV, multiple primaries may be allowed for the AP if the ML-STA has a good coupling. In such cases, all STAs (both legacy and ML STAs) may be configured for a single primary for uplink (UL) access. In such cases, an AP may perform channel access on any wireless link and may trigger a ML STA on any of the wireless links.

FIG. 11 shows a table summarizing different scenarios for cross-link NAV setting according to some implementations. The table in FIG. 11 summarizes various transmission scenarios where cross-link NAV setting may be used and the impact of cross-link NAV setting for each of these different scenarios (for example, good isolation or poor isolation at the AP). The table assumes (references) the same devices and wireless links shown in example FIGS. 8-10.

As shown, an initial UL transmission on Link 1, by an 802.11be or 802.11ax STA, may be preceded by an UL transmission with a (ML-)RTS/(ML-)CTS exchange. 802.11be STAs, upon hearing the AP's (ML-)CTS or the UL to the AP, may set their NAV (for each link) across multiple wireless links for the duration of the subsequent UL transmission on Link 1. As a result, 11be STAs may not attempt an UL on Link 2 because the cross NAV is set. Similarly, AP2 may not transmit on Link 2 because 802.11be STA has set its cross NAV and may not respond to AP2's ML-RTS.

As shown, AP1 may precede a DL transmission on Link 1 with a (ML-)RTS/(ML-)CTS exchange. For DL to pre-ax STAs, AP1 may directly start the DL transmission. 802.11be STAs, upon hearing AP's DL, may set their cross NAV for the duration of DL. As a result, 802.11be STAs may not attempt UL on Link 2 because their cross NAV is set, and because AP2 may not be able to transmit on the DL on Link 2 due to 802.11be STA's cross NAV being set (thereby not allowing response to AP2's ML-RTS).

As shown, an 802.11be STA may precede an UL transmission on Link 2 with a ML-RTS/ML-CTS exchange. Other 11be STAs, upon hearing AP2's ML-CTS, may set their cross NAV for the duration of UL. Thus, 802.11be STAs may not attempt to transmit on the UL of Link 1 because their cross NAV is set. AP1 may not be able to transmit on the DL on Link 1 because an 802.11be STA may not respond to API's ML-RTS (due to its cross NAV being set).

As shown, AP2 may precede DL transmission on Link 2 with a ML-RTS/ML-CTS exchange. Other 802.11be STAs may set their cross NAV for the duration of the DL transmission. Further, 802.11be STAs may not attempt to transmit on the UL on Link 1 because their cross NAV is set. AP1 may not be able to transmit on the DL on Link 1 because an 802.11be STA may not respond to AP1's ML-RTS (due to its cross NAV being set).

Figure 12:
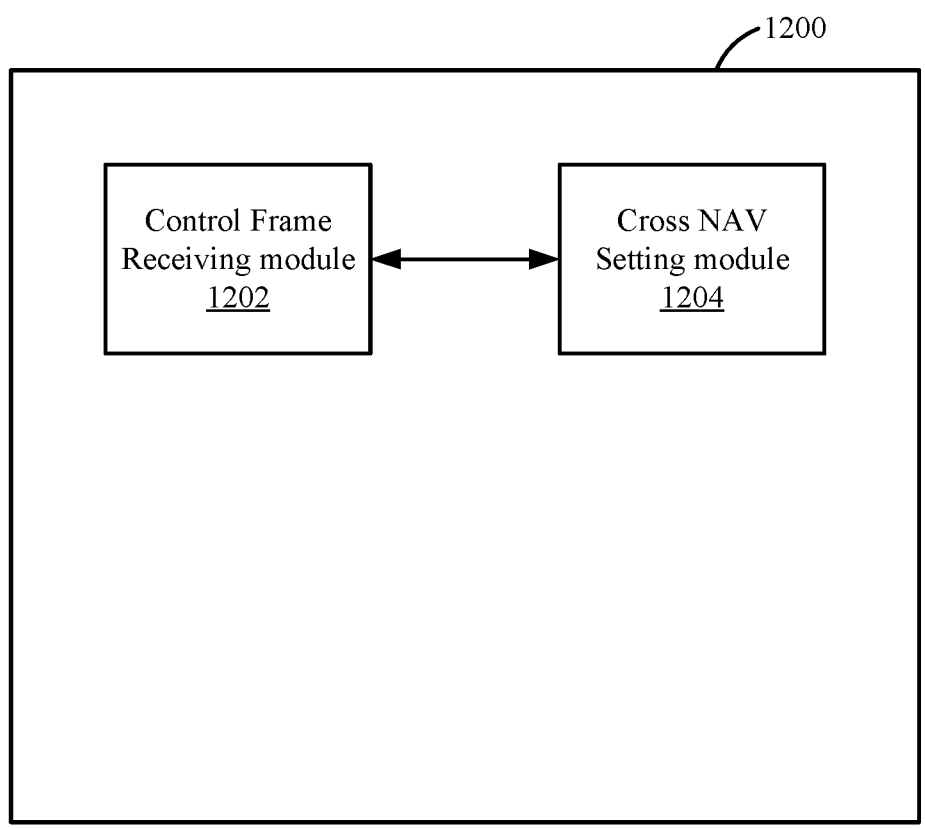
FIG. 12 shows a block diagram of an example wireless communication device according to some implementations.

FIG. 12 shows a block diagram of an example wireless communication device 1200 according to some implementations. In some implementations, the wireless communication device 1200 is configured to perform process 700 described above with reference to FIG. 7. The wireless communication device 1200 may be an example implementation of the wireless communication device 200 described above with reference to FIG. 2. For example, the wireless communication device 1200 may be a chip, System-on-Chip (SoC), chipset, package or device that includes at least one processor and at least one modem (for example, a Wi-Fi (IEEE 802.11) modem or a cellular modem). In some implementations, the wireless communication device 1200 may be a device that may implement a MLD entity, such as an AP (AP1/AP2) or STA (STA1/STA2), described above with reference to FIG. 8, 9, or 10. In some other implementations, the wireless communication device 200 may be a STA that includes such a chip, SoC, chipset, package or device as well as at least one transmitter, at least one receiver, and at least one antenna.

The wireless communication device 1200 includes a Control Frame Receiving module 1202 and a Cross NAV Setting module 1204. Portions of one or more of the modules 1202 and 1204 may be implemented at least in part in hardware or firmware. For example, the modules 1202 and 1204 may be implemented at least in part by a modem (such as the modem 202). In some implementations, at least some of the modules 1202 and 1204 are implemented at least in part as software stored in a memory (such as the memory 208). For example, portions of one or more of the modules 1202 and 1204 can be implemented as non-transitory instructions (or "code") executable by a processor (such as the processor 206) to perform the functions or operations of the respective module.

In some implementations, the Control Frame Receiving module 1202 may be configured for receiving (for example, receiving a first control frame transmitted on a first wireless link). In some implementations, the Cross NAV Setting module 1204 may be configured for setting (for example, for setting, in response to the reception of the first control frame, a NAV for each link of multiple wireless links of the first MLD based on a duration field in the first control frame).

Example Aspects

Aspect 1: A method for wireless communications by a first entity of a first multi-link device (MLD), comprising: receiving a first control frame transmitted on a first wireless link; and setting, in response to receiving the first control frame, a network allocation vector (NAV) for each link of multiple wireless links of the first MLD based on a duration field in the first control frame.

Aspect 2: The method of claim 1, wherein the first control frame comprises a request to send (RTS) frame or a clear to send (CTS) frame.

Aspect 3: The method of claim 1, wherein the setting of the NAV for the multiple wireless links comprises transmitting a control frame on each link of the multiple wireless links.

Aspect 4: The method of claim 3, wherein the transmitted control frame is configured to cause other MLDs to set a NAV for each link of the multiple wireless links of the respective other MLDs.

Aspect 5: The method of claim 1, wherein the setting of the NAV for the multiple wireless links comprises signaling a second entity of the first MLD to set the NAV for a second wireless link of the multiple wireless links.

Aspect 6: The method of claim 1, further comprising: receiving a second control frame on the first wireless link; and refraining from responding to the second control frame until expiration of a timer associated with the NAV for the first wireless link.

Aspect 7: The method of claim 1, further comprising determining whether a basic service set (BSS) identifier (BSSID) in the first control frame indicates that the first control frame was transmitted from a device that is part of a same basic service set (BSS) as the first MLD, wherein the setting of the NAV for the multiple wireless links is further based on the BSSID in the first control frame indicating that the first control frame was transmitted from a device that is part of a same BSS as the first MLD.

Aspect 8: The method of claim 1, further comprising configuring one or more devices not capable of multi-link aggregation (MLA) to operate on a common one of the multiple wireless links.

Aspect 9: The method of claim 8, wherein the configuration comprises transmitting an operation element that configures the one or more devices not capable of MLA to operate on the common one of the multiple wireless links.

Aspect 10: The method of claim 8, wherein the configuration comprises transmitting an operation element with a field having a value that indicates to the one or more devices not capable of MLA to send request to send (RTS) frames before transmitting on any of the multiple wireless links.

Aspect 11: The method of claim 1, further comprising transmitting signaling, wherein the signaling enables or disables setting a NAV for multiple wireless links for one or more other MLDs.

Aspect 12: The method of claim 11, further comprising enabling or disabling setting the NAV for multiple wireless links for one or more other MLDs based on one or more criteria associated with a capability of the first MLD.

Aspect 13: An apparatus for wireless communication by a first entity of a first multi-link device (MLD), comprising: at least one processor; and at least one memory communicatively coupled with the at least one processor and storing processor-readable code that, when executed by the at least one processor, is configured to cause the apparatus to: receive a first control frame transmitted on a first wireless link; and set, in response to receiving the first control frame, a network allocation vector (NAV) for each link of multiple wireless links of the first MLD based on a duration field in the first control frame.

Aspect 14: The apparatus of claim 13, wherein the first control frame comprises a request to send (RTS) frame or a clear to send (CTS) frame.

Aspect 15: The apparatus of claim 13, wherein the setting of the NAV for the multiple wireless links comprises transmitting a control frame on each link of the multiple wireless links.

Aspect 16: The apparatus of claim 15, wherein the transmitted control frame is configured to cause other MLDs to set a NAV for each link of the multiple wireless links of the respective other MLDs.

Aspect 17: The apparatus of claim 13, wherein the setting of the NAV for the multiple wireless links comprises signaling a second entity of the first MLD to set the NAV for a second wireless link of the multiple wireless links.

Aspect 18: The apparatus of claim 13, wherein the memory and the at least one processor are further configured to cause the apparatus to: receive a second control frame on the first wireless link; and refrain from responding to the second control frame until expiration of a timer associated with the NAV for the first wireless link.

Aspect 19: The apparatus of claim 13, wherein the memory and the at least one processor are further configured to cause the apparatus to determine whether a basic service set (BSS) identifier (BSSID) in the first control frame indicates that the first control frame was transmitted from a device that is part of a same basic service set (BSS) as the first MLD, wherein the setting of the NAV for the multiple wireless links is further based on the BSSID in the first control frame indicating that the first control frame was transmitted from a device that is part of a same BSS as the first MLD.

Aspect 20: The apparatus of claim 13, wherein the memory and the at least one processor are further configured to cause the apparatus to configure one or more devices not capable of multi-link aggregation (MLA) to operate on a common one of the multiple wireless links.

Aspect 21: The apparatus of claim 20, wherein the configuration comprises transmitting an operation element that configures the one or more devices not capable of MLA to operate on the common one of the multiple wireless links.

Aspect 22: The apparatus of claim 20, wherein the configuration comprises transmitting an operation element with a field having a value that indicates to the one or more devices not capable of MLA to send request to send (RTS) frames before transmitting on any of the multiple wireless links.

Aspect 23: The apparatus of claim 13, wherein the memory and the at least one processor are further configured to cause the apparatus to transmit signaling, wherein the signaling enables or disables setting a NAV for multiple wireless links for one or more other MLDs.

Aspect 24: The apparatus of claim 23, wherein the memory and the at least one processor are further configured to cause the apparatus to enable or disable setting the NAV for multiple wireless links for one or more other MLDs based on one or more criteria associated with a capability of the first MLD.

Additional Considerations

As used herein, the term "determining" may encompass one or more of a wide variety of actions. For example, "determining" may include calculating, computing, processing, deriving, investigating, looking up (for example, looking up in a table, a database or another data structure), and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations. The claims are to be accorded the widest scope consistent with this disclosure, the principles, and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram.

However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a first entity of a first multi-link device (MLD), comprising:
receiving a first control frame transmitted on a first wireless link;
setting, in response to receiving the first control frame, a network allocation vector (NAV) for each link of multiple wireless links of the first MLD based on a duration field in the first control frame;
receiving a second control frame transmitted on the first wireless link; and
refraining from responding to the second control frame until expiration of a timer associated with the NAV for the first wireless link.

2. The method of claim 1, wherein the first control frame comprises a request to send (RTS) frame or a clear to send (CTS) frame.

3. The method of claim 1, wherein the setting of the NAV for the multiple wireless links comprises transmitting another control frame on each link of the multiple wireless links.

4. The method of claim 3, wherein the another control frame is configured to cause other MLDs to set a NAV for each link of the multiple wireless links of the respective other MLDs.

5. The method of claim 1, wherein the setting of the NAV for the multiple wireless links comprises signaling a second entity of the first MLD to set the NAV for a second wireless link of the multiple wireless links.

6. The method of claim 1, further comprising determining whether a basic service set (BSS) identifier (BSSID) in the first control frame indicates that the first control frame was transmitted from a device that is part of a same basic service set (BSS) as the first MLD, wherein the setting of the NAV for the multiple wireless links is further based on the BSSID in the first control frame indicating that the first control frame was transmitted from the device that is part of a same BSS as the first MLD.

7. The method of claim 1, further comprising configuring one or more devices of the first MLD not capable of multi-link aggregation (MLA) to operate on a common one of the multiple wireless links.

8. The method of claim 7, wherein the configuration comprises transmitting an operation element that configures the one or more devices of the first MLD not capable of MLA to operate on the common one of the multiple wireless links.

9. The method of claim 7, wherein the configuration comprises transmitting an operation element with a field having a value that indicates to the one or more devices of the first MLD not capable of MLA to send request to send (RTS) frames before transmitting on any of the multiple wireless links.

10. The method of claim 1, further comprising transmitting signaling, wherein the signaling enables or disables setting a NAV for multiple wireless links for one or more other MLDs.

11. The method of claim 10, further comprising enabling or disabling setting the NAV for multiple wireless links for one or more other MLDs based on one or more criteria associated with a capability of the first MLD.

12. An apparatus for wireless communication by a first entity of a first multi-link device (MLD), comprising:
at least one processor; and
at least one memory communicatively coupled with the at least one processor and storing processor-readable code that, when executed by the at least one processor, is configured to cause the apparatus to:
receive a first control frame transmitted on a first wireless link;
set, in response to receiving the first control frame, a network allocation vector (NAV) for each link of multiple wireless links of the first MLD based on a duration field in the first control frame;
receive a second control frame transmitted on the first wireless link; and
refrain from responding to the second control frame until expiration of a timer associated with the NAV for the first wireless link.

13. The apparatus of claim 12, wherein the first control frame comprises a request to send (RTS) frame or a clear to send (CTS) frame.

14. The apparatus of claim 12, wherein the setting of the NAV for the multiple wireless links comprises transmitting another control frame on each link of the multiple wireless links.

15. The apparatus of claim 14, wherein the transmitted control frame is configured to cause other MLDs to set a NAV for each link of the multiple wireless links of the respective other MLDs.

16. The apparatus of claim 12, wherein the setting of the NAV for the multiple wireless links comprises signaling a second entity of the first MLD to set the NAV for a second wireless link of the multiple wireless links.

17. The apparatus of claim 12, wherein the memory and the at least one processor are further configured to cause the apparatus to determine whether a basic service set (BSS) identifier (BSSID) in the first control frame indicates that the first control frame was transmitted from a device that is part of a same basic service set (BSS) as the first MLD, wherein the setting of the NAV for the multiple wireless links is further based on the BSSID in the first control frame indicating that the first control frame was transmitted from the device that is part of a same BSS as the first MLD.

18. The apparatus of claim 12, wherein the memory and the at least one processor are further configured to cause the apparatus to configure one or more devices of the first MLD not capable of multi-link aggregation (MLA) to operate on a common one of the multiple wireless links.

19. The apparatus of claim 18, wherein the configuration comprises transmitting an operation element that configures the one or more devices of the first MLD not capable of MLA to operate on the common one of the multiple wireless links.

20. The apparatus of claim 18, wherein the configuration comprises transmitting an operation element with a field having a value that indicates to the one or more devices of the first MLD not capable of MLA to send request to send (RTS) frames before transmitting on any of the multiple wireless links.

21. The apparatus of claim 12, wherein the memory and the at least one processor are further configured to cause the apparatus to transmit signaling, wherein the signaling enables or disables setting a NAV for multiple wireless links for one or more other MLDs.

22. The apparatus of claim 21, wherein the memory and the at least one processor are further configured to cause the apparatus to enable or disable setting the NAV for multiple wireless links for one or more other MLDs based on one or more criteria associated with a capability of the first MLD.

23. The method of claim 1, wherein the second control frame comprises a request to send (RTS) frame or a clear to send (CTS) frame.

24. The apparatus of claim 12, wherein the second control frame comprises a request to send (RTS) frame or a clear to send (CTS) frame.

* * * * *